United States Patent [19]

Verbrugge

[11] Patent Number: 4,522,992

[45] Date of Patent: * Jun. 11, 1985

[54] AROMATIC MONOVINYL ALKENYL ALPHAOLEFIN ANHYDRIDE TERPOLYMERS

[75] Inventor: Calvin J. Verbrugge, Racine, Wis.

[73] Assignee: S. C. Johnson & Son, Inc., Racine, Wis.

[*] Notice: The portion of the term of this patent subsequent to Nov. 9, 1999 has been disclaimed.

[21] Appl. No.: 508,697

[22] Filed: Jun. 28, 1983

[51] Int. Cl.³ .......................................... C08F 222/04
[52] U.S. Cl. ..................................... 526/272; 524/549
[58] Field of Search ........................ 524/549; 526/272

[56] References Cited

U.S. PATENT DOCUMENTS

| Re. 27,140 | 6/1971 | Kay et al. | 524/549 |
|---|---|---|---|
| 3,488,311 | 1/1970 | Burdick et al. | 524/549 |
| 3,560,456 | 2/1971 | Hazen et al. | 524/549 |
| 3,598,778 | 8/1971 | Burdick et al. | 524/549 |
| 3,720,637 | 3/1973 | Bacskai | 524/549 |
| 3,723,375 | 3/1973 | Field et al. | 524/549 |
| 4,328,327 | 5/1982 | Tanaka et al. | 526/272 |
| 4,358,573 | 11/1982 | Varbrugge | 526/272 |

Primary Examiner—Joseph L. Schofer
Assistant Examiner—N. Sarofin

[57] ABSTRACT

Terpolymers of anhydrides, aromatic mono-alkenyl monomers and higher 1-alkenes are prepared. Aqueous dispersions of these terpolymers are also prepared.

12 Claims, No Drawings

AROMATIC MONOVINYL ALKENYL ALPHAOLEFIN ANHYDRIDE TERPOLYMERS

BACKGROUND OF THE INVENTION

This invention relates to terpolymers of maleic anhydride, at least one aromatic mono-alkenyl monomer and at least one 1-alkene having more than 18 carbon atoms.

Maleic anhydride alphaolefin copolymers are well known as are maleic anhydride alphaolefin terpolymers; see U.S. Pat. Nos. 3,553,177, 3,560,445, 3,560,456, 3,560,457, 4,358,573, 4,151,069 and 4,240,916. The first four patents describe copolymers and the like anhydride with specific alphaolefins, such as $C_{12}$ alphaolefin, $C_{16-18}$ alphaolefin and $C_{30}+$ alphaolefins. The last three patents describe terpolymers of maleic anhydride with mixtures of alphaolefins.

Styrene maleic anhydride copolymers are described in a number of patents, including U.S. Pat. Nos. 3,423,373, 3,277,116 and 3,256,296. These patents, however, are directed to copolymers of styrene and maleic anhydride and do not disclose terpolymers.

U.S. Pat. No. 3,723,375, describes terpolymers of styrene and maleic anhydride along with a termonomer having the formula

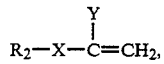

where $R_2$ is an organic radical containing 6 to 35 carbon atoms, Y is hydrogen, halogen, alkyl or phenyl and X is oxygen, sulphur, carboxy, carbonamido or a chemical bond. In Column 4 this patent describes possible monomers having the above formula, including five alphaolefins from 1-decene to 1-eicosene. The terpolymers as described in this patent have a relatively small amount of the termonomer, i.e., less than 15 mole percent and the example where the termonomer is a 1-olefin no more than 3.5 mole percent.

BRIEF DESCRIPTION AND OBJECTS OF THE INVENTION

It has been surprisingly found that terpolymers comprising from about 49 to 60 mole percent of an anhydride, from about 15 to 35 mole percent of at least one aromatic monoalkenyl monomer and from about 35 to 15 mole percent of least one 1-alkene having at least 18 carbon atoms can be prepared having low viscosity as an aqueous dispersion in alkali and other bases.

It is therefore the primary object of the present invention to provide a novel terpolymer of styrene, maleic anhydride and an alphaolefin.

It is a still further object of the present invention to provide an aqueous alkaline dispersion of a terpolymer of styrene, maleic anhydride and an alphaolefin.

It is a further object of the present invention to provide a composition which has good waxy properties characteristic of C18 and higher alphaolefins and yet has water dispersibility and good hardness.

Still further objects and advantages of the composition of the present invention will become more apparent from the following detailed description thereof.

DETAILED DESCRIPTION OF THE INVENTION

The instant invention relates to a terpolymer of from about 49 to 60 mole percent of an anhydride, from about 15 to 35 mole percent of at least one aromatic monoalkenyl monomer, and from about 35 to 15 mole percent of at least one 1-alkene having at least 18 carbon atoms.

The composition of the present invention also relates to an aqueous dispersion of a terpolymer of from about 49 to 60 mole percent of an anhydride, from about 15 to 35 mole percent of at least one aromatic mono-alkenyl monomer and from about 35 to 15 mole percent of at least one 1-alkene having at least 18 carbon atoms, this dispersion having a viscosity at 25° C. of less than 20 centipoise at 10 percent solids content and having a pH within the range from about 6.5 to 10.

It is noted above the terpolymers of the present invention include an anhydride. In addition to the preferred anhydride, maleic anhydride, certain other anhydrides can be utilized in the formation of the terpolymers of the present invention such as methyl maleic anhydride, di-methyl maleic anhydride, fluoro maleic anhydride, methyl ethyl maleic anhydride and the like. It is preferred that the anhydride be substantially free of acid and the like before polymerization. As noted above, the preferred anhydride is maleic anhydride.

The second component of the terpolymers of the present invention is a higher 1-alkene, i.e., a 1-alkene having at least 18 carbon atoms. These materials may be pure materials such as 1-octadecene or may be mixtures of various 1-alkenes such as mixed $C_{20}$, $C_{22}$ and $C_{24}$ 1-alkenes and the like. Suitable 1-alkenes for use in the terpolymers of the present invention include the following:

1-octadecene
1-eicosene
1-docosene
1-tetracosene
1-hexacosene
1-octacosene
1-triacontene
1-dotriacontene
1-tetratriacontene
1-hexatriacontene
1-octatriacontene
1-tetracontene
1-dotetracontene
1-tetratetracontene
1-hexatetracontene
1-octatetracontene
1-pentacontene
1-hexacontene
and mixtures thereof.

Both pure alkenes and mixed alkenes can be utilized. Typical mixtures of C30+ 1-alkenes are described in U.S. Pat. No. 3,553,177. Typically, these mixed higher alkenes are primarily even chain alphaolefins. The higher 1-alkene should essentially be free of di-olefins as these materials can cause gel formation and cross linking. Although small amounts of di-olefins, typically less than 2 percent, can be tolerated as impurity in the higher 1-alkene monomer, it is preferred that the level of saturates in the monomer be kept to a minimum generally less than 1 percent and preferably less than 0.3 percent, as the resulting polymer dispersions are hazy.

The preferred higher 1-alkenes are 1-eiocene, mixed $C_{20-24}$ 1-alkenes and mixtures thereof.

The third monomer in the terpolymers of the present invention is at least one aromatic monoalkenyl monomer. Suitable aromatic monomer alkenyls include styrene, alpha methyl styrene, vinyl toluene and the like.

The preferred aromatic monoalkenyl monomer is styrene.

Each of the above three monomers must be present in the terpolymers of the present invention in certain specific amounts in order to achieve the desired result. In other words, if too much aromatic monoalkenyl monomer is included, the waxy properties of the resultant terpolymers is reduced while if sufficient 1-alkene is not included, the materials do not have the appropriate waxy and slip properties.

The terpolymers of the present invention also may include minor portions of other modifying monomers. These monomers should be present in small quantities generally less than 3 mole percent. The purpose of these monomers is to modify one or more properties of the resulting terpolymer. Suitable modifying monomers include crosslinking agents such as divinylbenzene and the like.

As is well known in the art, polymers including maleic anhydride are essentially alternating polymers with maleic anhydride alternating between random comonomers. The alternating backbone occurs without regard to the relative ratio of the reactants. This phenomenan is described in various patents noted below relating to the process of preparing polymers of the instant application. Accordingly, terpolymers of the present invention will contain from 49 to 60 mole percent of anhydride preferably maleic anhydride. Under some conditions such as very high initiator levels it is possible to include some small excess of maleic anhydride relative to the comonomers in these polymers. The amount of aromatic monoalkenyl monomer present in the terpolymers of the present invention is from 15 to 35 mole percent while the amount of higher 1-alkene is similarly from 15 to 35 mole percent. The preferred terpolymers of the present invention include from 49 to 55 mole percent maleic anhydride and from 20 to 30 mole percent of aromatic monoalkenyl monomer and 20 to 30 mole percent higher 1-alkene.

The polymers of the present invention may be prepared by any of a number of conventional polymerization processes including polymerization processes as set forth in U.S. Pat. No. Re. 28475, U.S. Pat. Nos. 3,553,177, 3,560,455, 3,560,456, 3,560,457 and 3,488,311.

The terpolymers of the present invention are generally low molecular weight materials having a number average of molecular weight within the range of from 2,000 to 15,000 and preferably within the range of from 2,000 to 10,000.

One unexpected benefit of the terpolymers of the present invention is the ease with which solubilization of these polymers occurs. These polymers can be characterized as alkali soluble materials and can be prepared as alkali cuts having a solids content of up to 25 percent polymer. Suitable alkali materials include ammonium hydroxide, potassium hydroxide and sodium hydroxide. The preferred base for solubilizing these polymers is ammonium hydroxide. It is surprising that compositions containing substantial percentages of alphaolefin can be solubilized at a relatively low viscosity over a relatively short period of time. This is contrasted with materials outside the scope of the present invention whereby those containing high percentages of alphaolefin are difficultly soluble and do not produce a stable viscosity for an extended period of time.

These dispersions have a relatively low viscosity at moderate solids. Generally the viscosity of a 10 percent solids aqueous solution of the terpolymer will be less than 20 centipoise and preferably these dispersions will be less than 10 centipoise. These viscosities are to be measured at room temperature. In some instances, it is necessary to heat the polymer to get it completely solubilized.

It is theorized that one reason for this solubility is that the terpolymers of the present invention go directly to a fluid system without passing through a gel region characteristic of polymers containing higher 1-alkenes. This greatly increases the flexibility in preparing solutions of these terpolymers for end uses.

The dispersions of the terpolymers of the present invention are useful for a wide range of coatings including use as release agents, slip agents, anti-blocking agents and the like.

The compositions and dispersions of the present invention will now be more fully illustrated by way of the following examples. These examples are for illustration only and are in no way to be considered as limiting. In the following the temperatures are degrees Celsius and all parts and percentages, unless otherwise noted, are on a mole percent basis.

EXAMPLE 1

Charge 224 grams of 1-eicosene and 234 grams of cellosolve acetate to a 2000 milliliter reaction flask. Begin stirring and heat the mixture to 140° C. Melt 196 grams of maleic anhydride and then transfer it to a heated dropping funnel. Maintain the maleic anhydride in a molten state. Combine 125 grams of styrene and 15.52 grams of tertiarybutylperbenzoate and then transfer to a second dropping funnel.

Maintain 140° C. and run the reaction under a nitrogen head with continuous stirring, adding the contents of both dropping funnels at an even pace over a one-hour addition period. Upon completion of the addition, maintain 140° C. for a 45 minute hold period. Pour the contents of the flask into a container. Strip off the solvent by use of a wiped film evaporator to form dry polymer.

An ammonia cut of this polymer is prepared at 10 percent solids by mixing 200 grams of the polymer prepared above with 89.1 grams of 28 percent aqueous ammonia and 1710.9 grams distilled water at 70° C. This mixture was stirred for one hour at 70° C. The solution was cooled to room temperature, about 25° C. and had a viscosity of approximately 5.0 centipoise.

EXAMPLE 2

Using the procedure of Example 1, the polymers as described in Table 1 were prepared:

TABLE 1

| Polymer | 1-Eicosene | C20-24 1-Alkene | C30+ 1-Alkene | Styrene | Maleic Anhydride |
|---|---|---|---|---|---|
| A | — | — | — | 1.0 | 1.0 |
| B | 0.2 | — | — | 0.8 | 1.0 |
| C | 0.4 | — | — | 0.6 | 1.0 |
| D | 0.6 | — | — | 0.4 | 1.0 |
| E | 0.8 | — | — | 0.2 | 1.0 |
| F | 1.0 | — | — | — | 1.0 |
| G | — | 0.2 | — | 0.8 | 1.0 |
| H | — | 0.4 | — | 0.6 | 1.0 |
| I | — | 0.6 | — | 0.4 | 1.0 |
| J | — | 0.8 | — | 0.2 | 1.0 |
| K | — | 1.0 | — | — | 1.0 |
| L | — | — | 0.2 | 0.8 | 1.0 |
| M | — | — | 0.4 | 0.6 | 1.0 |
| N | — | — | 0.6 | 0.4 | 1.0 |
| O | — | — | 0.8 | 0.2 | 1.0 |

TABLE 1-continued

| Polymer | 1-Eicosene | C20-24 1-Alkene | C30+ 1-Alkene | Styrene | Maleic Anhydride |
|---------|------------|-----------------|---------------|---------|------------------|
| P | — | — | 1.0 | — | 1.0 |

Each of the polymers were dried either using a wipe film evaporator or evaporating the solvent off in an oven.

The molecular weights of the polymers were determined by Gel Permeation Chromatography. The polymers had the molecular weights as shown below in Table 2.

TABLE 2

| Polymer | $M_n$ | $M_w$ | $M_z$ |
|---------|-------|-------|-------|
| A | 1390 | 2680 | 4790 |
| B | 2150 | 4940 | 8910 |
| C | 2990 | 7500 | 16740 |
| D | 3030 | 6990 | 13220 |
| E | 3140 | 6450 | 11000 |
| F | 2640 | 4610 | 6910 |
| G | 4250 | 15660 | 43750 |
| H | 3900 | 14550 | 41470 |
| I | 3300 | 11800 | 29500 |
| J | 2640 | 8980 | 20160 |
| K | 1850 | 5420 | 10130 |
| L | 3820 | 14750 | 39440 |
| M | 2850 | 10750 | 26880 |
| N | 2620 | 8360 | 18400 |
| O | 1870 | 5650 | 12380 |
| P | 1530 | 3950 | 8100 |

EXAMPLE 3

10 percent of the polymers described in Table 1 were neutralized using 28 percent ammonia to 100 percent neutralization. The polymers were neutralized at three temperatures: 27° C., 40° C., and 70° C. After one hour of shaking or stirring, the viscosity was measured at 25° C. using both the Brookfield viscometer and the Nameter viscometer. The viscosity readings are shown in Table 2. For those polymers which had a relatively low viscosity at low temperature, the runs were not repeated at higher temperatures since the viscosity, once it reaches the range from 5 to 20 centipoise, stabilizes and shows no further decrease. Furthermore, once the viscosity was reduced to within the above range by heating, the cooled solution maintained that low viscosity.

TABLE 3

| Polymer | Temp. °C. | Viscosity cps Brookfield | Nametre | Time |
|---------|-----------|--------------------------|---------|------|
| A | 27 | 5.0 | 2.8 | 1 hour |
| B | 27 | 20.4 | 18.1 | 1 hour |
| C | 27 | 460,000 | 5,800 | 1 hour |
| D | 27 | 6,000 | 57.6 | 1 hour |
| E | 27 | 22.2 | 10.0 | 1 hour |
| F | 27 | 59.0 | 30.8 | 1 hour |
| C | 40 | 2,600 | — | 1 hour |
| D | 40 | 9.3 | 6.9 | 1 hour |
| E | 40 | 6.4 | 3.9 | 1 hour |
| F | 40 | 6.5 | 3.9 | 1 hour |
| C | 70 | 5.0 | 2.8 | 1 hour |
| G | 70 | 11.5 | 8.6 | 2 hours |
| H | 70 | 12.8 | 5.7 | 1 hour |
| I | 70 | 6.0 | 2.5 | 1 hour |
| J | 70 | 5.5 | 2.0 | 1 hour |
| K | 70 | 7.0 | 4.6 | 1.5 hours |
| L | 70 | 79,250 | 1740 | 1.5 hours |
| M | 70 | 880 | 96.5 | 1 hour |
| N | 70 | 8.8 | 5.6 | 1 hour |
| O | 70 | 12.5 | 3.0 | 1 hour |
| P | 70 | 6.3 | 2.4 | 2 hours |

Except for Polymers K, N, O, and P, each of the polymer resin cuts described in Table 2 were clear indicating complete solubilization. It is interesting to note that even the very viscous cuts were substantially clear.

EXAMPLE 4

Charge 224 grams of 1-eicosene and 244 grams of cellosolve acetate to a 2000 milliliter reaction flask. Begin stirring and heat the mixture to 140° C. Melt 204.2 grams of maleic anhydride and then transfer it to a heated dropping funnel. Maintain the maleic anhydride in a molten state. Combine 125 grams of styrene, 15.52 grams of tertiarybutylperbenzoate and 5.45 grams of divinyl benzene (9.90 grams of 55 percent material) and then transfer to a second dropping funnel.

Maintain 140° C. and run the reaction under a nitrogen head with continuous stirring, adding the contents of both dropping funnels at an even pace over a one-hour addition period. Upon completion of the addition, maintain 140° C. for a 45 minute hold period. Pour the contents of the flask into a container. Strip off the solvent by use of a wiped film evaporator to form the dry polymer.

An ammonia cut of this polymer was prepared at 10 percent solids by mixing 200 grams of the above polymer with 89.1 grams of 28 percent aqueous ammonia and 1710.9 grams of distilled water. This mixture was stirred for one hour at 70° C. The resulting solution was cooled to room temperature and had a viscosity of about 5.0 centipoise at 25° C.

EXAMPLE 5

Using the procedure of Example 4, the following polymers, as set forth in Table 4, were prepared.

TABLE 4

| Polymer | Styrene (Moles) | 1-Eicosene (Moles) | Maleic Anhydride (Moles) | Divinyl Benzene (% by Weight) |
|---------|-----------------|--------------------|--------------------------|-------------------------------|
| Q | 1.0 | 0.0 | 1.0 | 1.0 |
| R | 0.8 | 0.2 | 1.0 | 1.0 |
| S | 0.6 | 0.4 | 1.0 | 1.0 |
| T | 0.4 | 0.6 | 1.0 | 1.0 |
| U | 0.2 | 0.8 | 1.0 | 1.0 |
| V | 0.0 | 1.0 | 1.0 | 1.0 |

The molecular weight of the above resins were determined by gel permeation chromatography and have the number average molecular weight, weight average molecular weight and Z average molecular weight as shown in Table 5.

TABLE 5

| Polymer | $M_n$ | $M_w$ | $M_z$ |
|---------|-------|-------|-------|
| Q | 1810 | 4320 | 9100 |
| R | 3240 | 10550 | 42980 |
| S | 3410 | 11620 | 66570 |
| T | 3580 | 10210 | 35910 |
| U | 3340 | 7850 | 16370 |
| V | 2940 | 5850 | 9920 |

EXAMPLE 6

10 percent non-volatile ammonia cuts of the polymers of Example 5 were made by using 28 percent aqueous ammonia to obtain 100 percent neutralization. These materials were neutralized at three temperatures: 27° C., 40° C., and 70° C. At lower temperatures certain of the resins, as noted in Table 6, did not dissolve fully after one day. For those polymer solutions with a viscosity of less than 70 centipoise, the viscosity at 25° C. remained low after cooling to room temperature.

TABLE 6

| Polymer | Temp. °C. | Viscosity cps Brookfield | Nametre | Time | Notes |
|---|---|---|---|---|---|
| Q | 27 | 5.0 | 3.6 | 1 hour | |
| R | 27 | 67.4 | 30.0 | 1 hour | |
| S | 27 | 710.000 | 22,400 | 1 hour | 1,2 |
| T | 27 | 288,000 | 1,680 | 1 hour | 1,3 |
| U | 27 | — | — | 1 hour | 4 |
| V | 27 | 625 | 67 | 1 hour | |
| S | 40 | 2600 | — | 1 hour | 5 |
| T | 40 | 9.3 | 6.9 | 1 hour | |
| U | 40 | 6.4 | 3.9 | 1 hour | |
| V | 40 | 6.5 | 3.9 | 1 hour | |
| S | 70 | 3.8 | 2.5 | 1 hour | |

Notes:
1 - Not all dissolved after one day.
2 - Brookfield viscosity after 2 months = 7,300 cps.
3 - Brookfield viscosity after 2 months = 11,500 cps.
4 - Not all dissolved after one day, no one hour reading taken, Brookfield viscosity after 2 months = 540 cps.
5 - Brookfield viscosity after 4 days = 30.0 cps.

What I claim is:

1. A terpolymer of from about 49 to 60 mole percent of a maleic anhydride, from about 20 to 40 mole percent of at least one aromatic mono-alkenyl monomer selected from the group consisting of styrene, alphamethyl styrene, vinyl toluene and mixtures thereof, and from about 40 to 20 mole percent of at least one 1-alkene having at least 18 carbon atoms.

2. The terpolymer of claim 1 wherein the 1-alkene is 1-eicosene.

3. The terpolymer of claim 1 wherein the 1-alkene is a mixture of 1-alkenes having from 20 to 24 carbon atoms.

4. The terpolymer of claim 1 wherein the aromatic mono-alkenyl monomer is styrene.

5. The terpolymer of claim 1 of from about 49 to 55 mole percent maleic anhydride, 20 to 30 mole percent styrene and from 30 to 20 mole percent of at least one 1-alkene having at least 18 carbon atoms.

6. The terpolymer of claim 5 wherein the 1-alkene is 1-eicosene.

7. An aqueous alkaline dispersion of a terpolymer of from about 49 to 60 mole percent of a maleic anhydride, from about 20 to 40 mole percent of at least one aromatic mono-alkenyl monomer selected from the group consisting of styrene, alphamethyl styrene, vinyl toluene and mixtures thereof, and from about 40 to 20 mole percent of at least one 1-alkene having at least 18 carbon atoms, said dispersion having a viscosity at 25° C. of less than 20 centipoise at 10 percent terpolymer and having a pH within the range of from 6.5 to 10.

8. The aqueous dispersion of claim 7 wherein the 1-alkene is 1-eicosene.

9. The aqueous dispersion of claim 7 wherein the 1-alkene is a mixture of 1-alkenes having from 20 to 24 carbon atoms.

10. The dispersion of claim 7 wherein the aromatic mono-alkyl monomer is styrene.

11. The dispersion of claim 7 wherein the terpolymer comprises from 49 to 55 mole percent maleic anhydride, from 20 to 30 mole percent styrene, and from 30 to 20 mole percent 1-alkene.

12. The dispersion of claim 11 wherein the 1-alkene is 1-eicosene.

* * * * *